Patented July 13, 1954

2,683,655

UNITED STATES PATENT OFFICE 2,683,655

SEPARATION OF AMERICIUM AND CURIUM FROM AQUEOUS SOLUTIONS

Donald F. Peppard, Chicago, and Peter R. Gray, Worth, Ill., assignors to the United States of America as represented by the United States Atomic Energy Commission No Drawing. Application September 10, 1952, Serial No. 308,907

7 Claims. (Cl. 23—312)

This invention deals with the separation of americium and curium values contained in aqueous solutions, and in particular with their separation by solvent extraction.

When $U^{238}$ is bombarded with neutrons, $U^{239}$ is formed, which disintegrates by emitting beta particles and forms $Pu^{239}$. This $Pu^{239}$, when exposed to further neutron bombardment so that two more neutrons are absorbed, is transformed to $Pu^{241}$ which, under beta emission, forms $Am^{241}$. $Am^{241}$, again by neutron absorption, is converted to $Am^{242}$ which, with a half-life of 16 hours, beta-decays to $Cm^{242}$. Thus, there is always a mixture of americium and curium present in the reaction mass of a neutronic reactor using $U^{238}$, the americium being partly non-reacted $Am^{241}$ and partly $Am^{242}$ that has not yet decayed to $Cm^{242}$.

$Cm^{242}$ is valuable as an alpha-emitter on account of its relatively long half-life (162 days). For most uses of curium it is desirable to have it in relatively pure form and therefore to separate it from the americium generally associated therewith. Chemical processes used for this purpose have not been very successful because of the chemical similarity of the two elements and their both being trivalent.

It is an object of this invention to provide a process by which americium and curium values contained in an aqueous solution can be separated from each other in a simple and efficient manner.

It is another object of this invention to provide a process for the recovery of pure americium and pure curium from aqueous solutions which contain both in a mixture.

It is also an object of this inventon to provide a process for transferring americium and/or curium from a relatively dilute aqueous solution to a considerably smaller volume of liquid so that a concentration effect is obtained.

It was found that liquid, substantially water-immiscible alkyl phosphates preferentially extract the curium values from a concentrated nitric acid-containing aqueous solution of curium and americium salts. Thus, by making an aqueous americium-curium solution highly acid with regard to nitric acid and contacting this acid solution with a substantially water-immiscible alkyl phosphate, curium is extracted to a higher degree than the americium, so that an increased (with regard to the ratio present in the original aqueous solution) ratio of curium/americium is obtained in the solvent extract phase and a decreased ratio is obtained in the aqueous raffinate. Repetition of the extraction brings about further separation and thus a higher degree of decontamination.

A set of extraction runs was carried out with aqueous solutions containing americium and curium values, respectively, in tracer amounts and also having various acid and salting-out salt contents. Tributyl phosphate was used as the extractant. The results of these runs are compiled in Table I.

Table I

| Composition of Aqueous Solution as to— | | Distribution Ratio, org./aq. | |
|---|---|---|---|
| Acid | Salting-out Salt | Am | Cm |
| 10 N HCl | | 0.01 | 0.01 |
| 0.4 N HCl | 7.2 N AlCl$_3$ | 0.07 | 0.06 |
| 0.4 N HNO$_3$ | 7.2 N Al(NO$_3$)$_3$ | 110 | 100 |

This set of experiments shows that of these two acids nitric acid is superior and absolutely necessary in order to accomplish a substantial extraction of americium and curium. From a solution of 0.4 N in nitric acid and 7.2 N in aluminum nitrate a very good extraction of americium and curium was obtained; however, the extraction was practically equally good for both. This would suggest that a separation of americium from curium by extraction with alkyl phosphate is not possible.

Further investigation, however, resulted in the unexpected finding that a highly selective extraction of curium is obtained provided that the aqueous solution contains a high concentration of nitric acid. This is shown in the following Example I.

Example I

An aqueous aluminum nitrate-free solution of americium and curium nitrates in a total concentration corresponding to $3.3 \times 10^5$ cts./min. was made 15.6 N in nitric acid, and 2 ml. of this "feed" solution were used for the experiment. Undiluted tributyl phosphate was used as the extractant; the tributyl phosphate had been pretreated by washing with sodium carbonate to remove the mono- and dibutyl phosphates and subsequently equilibrated with 15.6 N nitric acid.

The extraction was carried out in a multiple batch system. Each of four containers contained 2 ml. of the pretreated extractant. The 2 ml. of feed solution were passed through the first container and from there consecutively through the second, third and fourth containers. The aqueous solution leaving the fourth container is designated solution "A."

Thereafter five 2-ml. portions of 15.6 N nitric acid, equilibrated with tributyl phosphate, were passed through the first container as scrub solution; the fifth portion of scrub solution leaving the first container was solution "B." Thereafter the tributyl phosphate in the first container was given six more scrub treatments using the same conditions as in the previous five treatments. The last of these six aqueous solutions leaving the tributyl phosphate in the first container was solution "C."

Aliquots of these various solutions were analyzed by alpha-pulse analysis for their americium and curium contents. The percentages of americium and curium present in the various solutions are given in Table II.

Table II

| Solution | Cm, Percent | Am, Percent |
|---|---|---|
| Feed | 26 | 74 |
| "A" | 5 | 95 |
| "B" | 44 | 56 |
| "C" | 58 | 42 |

It will be seen that the aqueous raffinate (solution "A") contained a much higher ratio of americium/curium than the feed solution. The first container, which obviously absorbed most of the curium, was further decontaminated by the scrubbing procedures. This example shows that good enrichment and separation are possible even in a non-continuous system.

All liquid, substantially water-immiscible alkyl phosphates are usable for the process of this invention; however, the trialkyl phosphates, such as trioctyl phosphate, trihexyl phosphate, and triamyl phosphate, are preferred. The best results were obtained with tributyl phosphate. The alkyl phosphates may be used as such, or they may be diluted, for the purpose of decreasing their viscosity and easier phase separation, with an inert organic solvent.

As has been illustrated above, the presence of nitric acid is necessary for the operativeness of the process of this invention, and a concentration thereof of at least 10 N should be chosen. A concentration of from 15 to 16 N has been found the preferred concentration.

Instead of selectively extracting the curium, the americium and curium may first be coextracted from their aqueous solution, which in this case preferably has a low content of nitric acid but a high content of a water-soluble nitrate, such as aluminum nitrate. Other nitrates suitable as salting-out agents are sodium nitrate, calcium nitrate, potassium nitrate, strontium nitrate, lithium nitrate, magnesium nitrate, ammonium nitrate, lanthanum nitrate, and manganese nitrate. A concentration of these nitrates of about 7 N has given very good results. After the americium and curium values have been extracted into the alkyl phosphate and the extract phase has then been separated from the remaining aqueous solution, the americium can be selectively back-extracted from the organic extract phase by contacting the latter with a concentrated nitric acid solution; the bulk of the curium is left thereby in the alkyl phosphate.

In the following, another example is given which also demonstrates the separation of americium and curium by the process of this invention. This and Example I are not intended to limit the invention to the details given therein, but are disclosed for illustrative purposes only.

Example II

A continuous counter-current extraction process was simulated by contacting in seven separatory funnels an aqueous "feed" solution containing the americium and curium with tributyl phosphate and the tributyl phosphate extract phase obtained with an aqueous scrub solution. Before starting the cycles proper of the operation, funnels 1, 2, 3 and 4 were supplied with the scrub solution and funnels 4, 5, 6 and 7 with tributyl phosphate. The feed solution was introduced into funnel 4, and the mixture of feed, scrub and tributyl phosphate contained therein was shaken and then allowed to separate. The solvent extract phase obtained in funnel 4 was added to the content of funnel 3, while the aqueous phase of funnel 4 was introduced into funnel 5. Both funnel 3 and funnel 5 were then shaken and the phases therein allowed to separate; the organic phase of funnel 3 was transferred to funnel 2, while the aqueous phase of funnel 3 was introduced into funnel 4. Likewise, the organic phase of funnel 5 was transferred into funnel 4 and the aqueous phase of funnel 5 into funnel 6. Funnels 2 and 6 were then shaken, and the organic phase of funnel 2 was introduced into funnel 1 and the aqueous phase of funnel 2 into funnel 3. The organic and aqueous phases of funnel 6 were introduced into funnels 5 and 7, respectively. Funnels 1 and 7 were then shaken; the organic phase of funnel 1 was taken out of the system, while the aqueous phase was transferred into funnel 2; at the same time the organic phase of funnel 7 was brought into funnel 6, while the aqueous phase of funnel 7 was taken out of the system. This completed "throughput" #1.

After this starting operation and throughput #1, each further throughput comprised the introduction of tributyl phosphate into funnel 7, of feed into funnel 4 and of aqueous scrub solution into funnel 1, shaking plus subsequent phase separation in all of the seven funnels, and transfer of each organic phase obtained to the preceding funnel and of each aqueous phase obtained to the following funnel; each throughput also comprised removal of a solvent extract phase from funnel 1 and of an aqueous raffinate from funnel 7.

Twenty-five such throughputs were carried out in this example and the twenty-fifth organic effluent of funnel 1 and the twenty-fifth aqueous effluent of funnel 7 were analyzed for their respective americium and curium contents.

The feed solution used for this example was obtained by dissolving a mixture of americium and curium nitrates in 1 ml. of 15.6 N nitric acid; 25 microliters of this solution were used for each throughput. These 25 microliters of the feed solution contained about 500,000 cts./min., and curium and americium were present in a proportion of 46% and 54%, respectively.

The tributyl phosphate had been subjected to a preparatory treatment which consisted of washing with sodium carbonate followed by washing with water for removal of sodium carbonate. After these washing steps the tributyl phosphate was equilibrated with 15.6 N nitric acid. A 10-ml. portion of the thus treated tributyl phosphate was used for each throughput.

The scrub solution used was 15.6 N nitric acid; it was added in portions of 30.975 ml. so that the total of aqueous media (scrub plus feed) added amounted to 31 ml. The analytical results obtained with the aqueous and organic effluents of the twenty-fifth throughput are given and compared with the composition of the feed solutions in Table III.

*Table III*

|  | Cm, Percent | Am, Percent |
| --- | --- | --- |
| Feed | 46 | 54 |
| 25th solvent effluent | 74 | 26 |
| 25th aqueous effluent | 19 | 81 |

These data show that, while the curium was enriched in the organic phase by the run of this example, the concentration of the americium was increased in the aqueous phase.

It will be understood that this invention is not to be limited to the details given herein but that it may be modified within the scope of the appended claims.

What is claimed is:

1. A process of separating americium and curium values contained as a mixture in a solution, comprising contacting an aqueous concentrated nitric acid medium and a substantially water-immiscible alkyl phosphate medium, at least one of said media containing the americium and curium in solution, whereby said curium values are preferentially held by said alkyl phosphate medium while said americium values are preferentially held by said aqueous medium, and separating an alkyl phosphate phase from an aqueous phase.

2. The process of claim 1 wherein the nitric acid medium contains said nitric acid in a concentration of at least 10 N.

3. The process of claim 2 wherein the concentration ranges from 15 to 16 N.

4. The process of claim 2 wherein the alkyl phosphate is a trialkyl phosphate.

5. The process of claim 4 wherein the trialkyl phosphate is tributyl phosphate.

6. A process of separating americium and curium values from an aqueous solution, comprising making said solution at least 10 N in nitric acid, contacting said solution with a tributyl phosphate-containing solvent whereby curium is preferentially extracted into an organic extract phase while americium preferentially remains in the aqueous solution, and separating the organic phase from the aqueous solution.

7. A process for separating americium and curium values from an aqueous solution, comprising incorporating aluminum nitrate into said solution, contacting the solution with tributyl phosphate whereby americium and curium are taken up by an organic extract phase, separating said organic phase from the aqueous solution, contacting said organic phase with concentrated nitric acid of at least 10 N whereby americium is preferentially taken up by said nitric acid while curium preferentially remains in the tributyl phosphate.

References Cited in the file of this patent

Fischer, Naturwissenschaften, vol. 25, page 348 (1937).

Warf, U. S. Atomic Energy Commission declassified document No. 2524, declassified March 11, 1949, 10 pages.

Glueckauf et al., Journal of the Chemical Society (London), 1949, Part V, Suppl., No. 2, pages S-299 to S-302.

Morton, Laboratory Technique in Organic Chemistry, pages 195-208 (1938), published by McGraw-Hill Book Co., N. Y.